US006126186A

United States Patent [19]

Mascari

[11] Patent Number: 6,126,186

[45] Date of Patent: Oct. 3, 2000

[54] CONSTANT CENTER OF GRAVITY TILT SEAT OF A WHEELCHAIR

[75] Inventor: Nicholas A. Mascari, Newburgh Heights, Ohio

[73] Assignee: Invacare Corporation, Elyria, Ohio

[21] Appl. No.: 09/188,851

[22] Filed: Nov. 9, 1998

[51] Int. Cl.[7] ........ B62M 1/00

[52] U.S. Cl. ........ 280/220; 280/250.1

[58] Field of Search ........ 280/250.1, 650, 280/220, 230; 180/907; 297/325, 329

[56] References Cited

U.S. PATENT DOCUMENTS

| | | | |
|---|---|---|---|
| 137,091 | 3/1873 | Parker | 248/395 |
| 160,624 | 3/1875 | Spencer | 248/395 |
| 1,438,667 | 12/1922 | Schops . | |
| 1,970,577 | 8/1934 | Schauss | 297/329 |
| 3,901,527 | 8/1975 | Danzinger et al. | 280/638 |
| 4,383,714 | 5/1983 | Ishida | 297/325 |
| 4,759,561 | 7/1988 | Janssen . | |
| 4,842,232 | 6/1989 | Yves et al. . | |
| 4,893,827 | 1/1990 | Gay et al. . | |
| 4,957,302 | 9/1990 | Maxwell | 280/32.6 |
| 4,966,379 | 10/1990 | Mulholland . | |
| 5,044,647 | 9/1991 | Patterson . | |
| 5,137,295 | 8/1992 | Peek | 280/304.1 |
| 5,154,438 | 10/1992 | Barclay . | |
| 5,294,141 | 3/1994 | Mentessi et al. | 280/250.1 |
| 5,297,021 | 3/1994 | Koerlin et al. . | |
| 5,333,887 | 8/1994 | Luther | 280/250.1 |
| 5,458,349 | 10/1995 | Mung-Tung | 280/250.1 |
| 5,624,159 | 4/1997 | Celoni et al. | 297/325 |
| 5,772,226 | 6/1998 | Bobichon | 280/250.1 |
| 5,785,384 | 7/1998 | Sagstuen . | |
| 5,797,252 | 8/1998 | Goman | 56/17.2 |
| 5,884,928 | 3/1999 | Papac | 280/250.1 |
| 5,967,609 | 10/1999 | Potter | 297/325 |

FOREIGN PATENT DOCUMENTS

| | | | |
|---|---|---|---|
| 0405542 | 1/1991 | European Pat. Off. | 280/250.1 |
| 0 405 542 | 1/1991 | Germany . | |
| 504239 | 5/1939 | United Kingdom . | |
| 509033 | 8/1939 | United Kingdom . | |

*Primary Examiner*—J. J. Swann
*Assistant Examiner*—Michael Cuff
*Attorney, Agent, or Firm*—Hudak & Shunk Co. L.P.A.

[57] ABSTRACT

A tilt seat of a wheelchair is operatively connected to a wheelchair frame through an archial support member and through a gear rack such that as the seat is tilted, the center of gravity of a person seated in the wheelchair is substantially maintained. A bracket which slides along the gear rack can be stopped at or released at any desired seat tilt inclination.

42 Claims, 4 Drawing Sheets

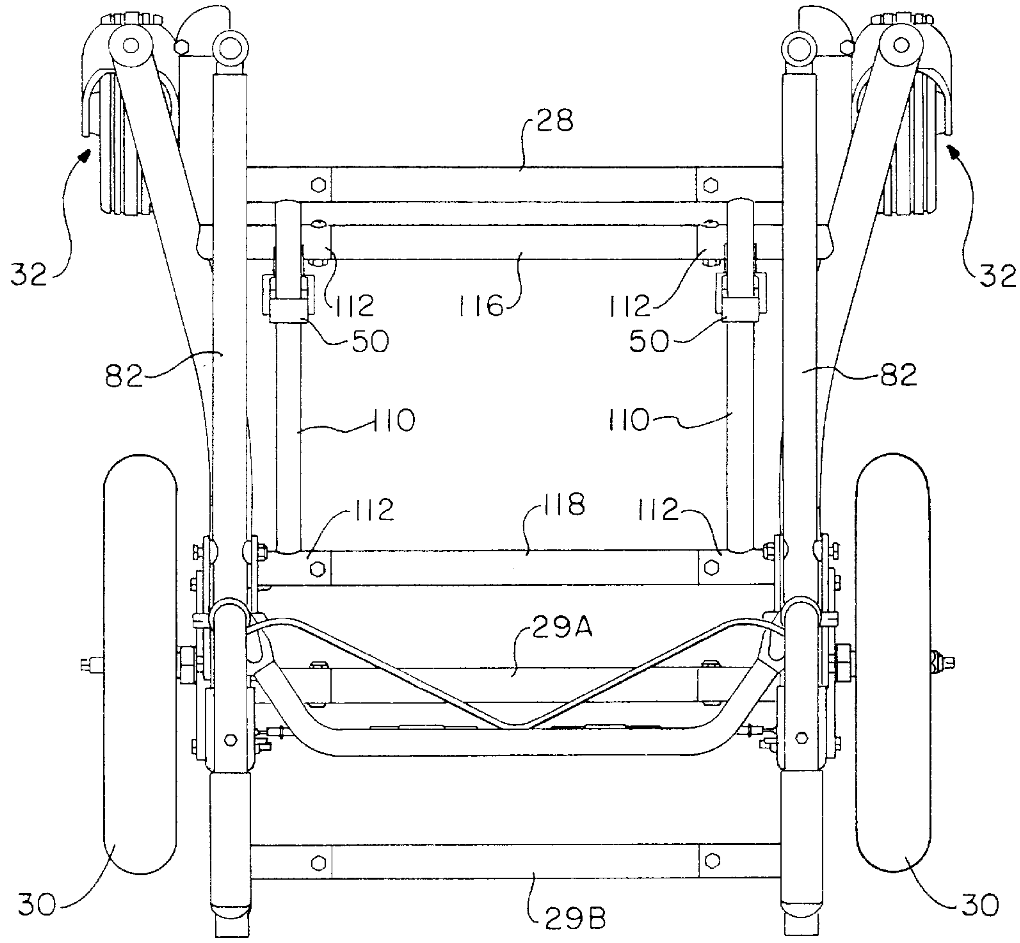
FIG.-4
FIG.-6
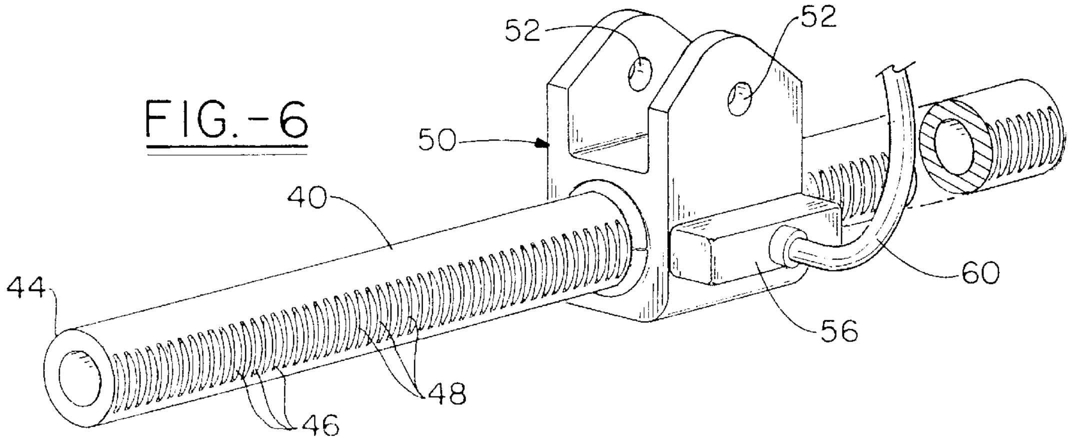

CONSTANT CENTER OF GRAVITY TILT SEAT OF A WHEELCHAIR

FIELD OF INVENTION

The present invention relates to a wheelchair having a tilt seat containing a back member and a bottom member which seat is tilted as an integral unit while maintaining the center of gravity of a person seated therein.

BACKGROUND OF THE INVENTION

Heretofore, wheelchairs have existed wherein the chair or seat portion thereof was rockable about a common axis, or tilted about the rear apex of the seat, or which was pivotally connected to side members of a chair at a plurality of points to allow tilting thereof.

For example, U.S. Pat. No. 4,893,827 relates to a chair for use by an incapacitated person having a wheeled frame which carries a body support assembly composed of a seat, a back, and a foot rest. The back is angularly adjustable relative to the seat and the footrest is angularly adjustable relative to the seat. The body support assembly is rockable as a unit relative to the frame to enable the entire assembly to occupy any one of a number of tilted positions. The body support assembly may be removed as a unit from the frame for use as a car seat or the like.

U.S. Pat. No. 5,785,384 relates to a device for an adjustable chair where the back of the chair at a first mounting site on each side thereof is pivotally connected to respective side members of the chair and at a second mounting site forms a hinged connection with a rear part of the chair set frame, where the chair seat frame at a front mounting site on each side thereof is slidably connected to a respective side member along a front guide which forms a part of the side member. The first mounting site on the chair back is designed to slide along a rear, forward and downward inclining guide in the side member and the seat frame has on each side a rear mounting site between said front mounting site and said second mounting site for the chair back, said rear mounting site forming a slidable connection with a guide in each respective side member, which is located between the front and rear guides when seen in the longitudinal direction of the side member which is either horizontal or inclines slightly forward and upward.

U.S. Pat. No. 5,044,647 relates to a kit or assembly which can be used in the manufacture of a new wheelchair or to retrofit an existing wheelchair. The basic wheelchair structure includes a base portion having a pair of cross members mounted in the rear half of the upper portion of the wheelchair base structure. A pair of parallel guide rails are mounted between the cross members with a seat support bar attached to a pair of pillow blocks mounted on the guide rails. A linear actuator is centrally positioned within the wheelchair base structure to longitudinally move the seat support bar forwardly or rearwardly within the wheelbase of the wheelchair. A rear edge of a wheelchair seat unit is pivotally attached to the upper surface of the seat support bar. Cam plates, each having a curved cam slot, are provided on each side of the seat unit with the cam slots engaging cam followers mounted on a pair of stanchions provided on each side of the rear portion of the base structure. A control switch causes the linear actuator to move the seat support bar in a forward or rearward direction which causes the seat unit to move causing the cam follower pins positioned within the cam slots to tilt or angularly move the seat unit to a maximum reclined position of 60 degrees. The entire seat unit is moved forward a predetermined distance to obtain the desired degree of tilt and to maintain the center of gravity substantially centered within the base structure to maintain the balance and stability of the wheelchair and the safety of the patient.

SUMMARY OF INVENTION

A tiltable seat of a wheelchair has a back member and a bottom member with the bottom member being supported by an archial support member which slides or rolls over a support arm which is connected to the frame of the wheelchair. The seat, generally at the junction of the back member and the bottom member, is also slidably attached through a link and a bracket, having a pivot pin, to a gear rack which in turn is connected to the frame. The radius of curvature of the archial support member is desirably such that the end point of the radius generally coincides with the center of gravity of a hypothetical or composite person seated within the chair, and the angle of the gear rack is generally such that it approximates the arc of the bracket pivot pin about the center of gravity location if the seat were not connected to the gear rack. Through the use of a spring loaded hand grip and pull cable, the seat can be inclined to any desired tilt position and maintained there until the hand grip is subsequently released and the seat moved to another position.

BRIEF DESCRIPTION OF THE DRAWINGS

FIG. 4 is a top plan view taken in line 4—4 of FIG. 2 showing the wheelchair frame assembly, the archial support member, cross frame members, and the like.

FIG. 6 is a perspective view of the gear rack.

DETAILED DESCRIPTION OF THE PREFERRED EMBODIMENT

Figure 1:
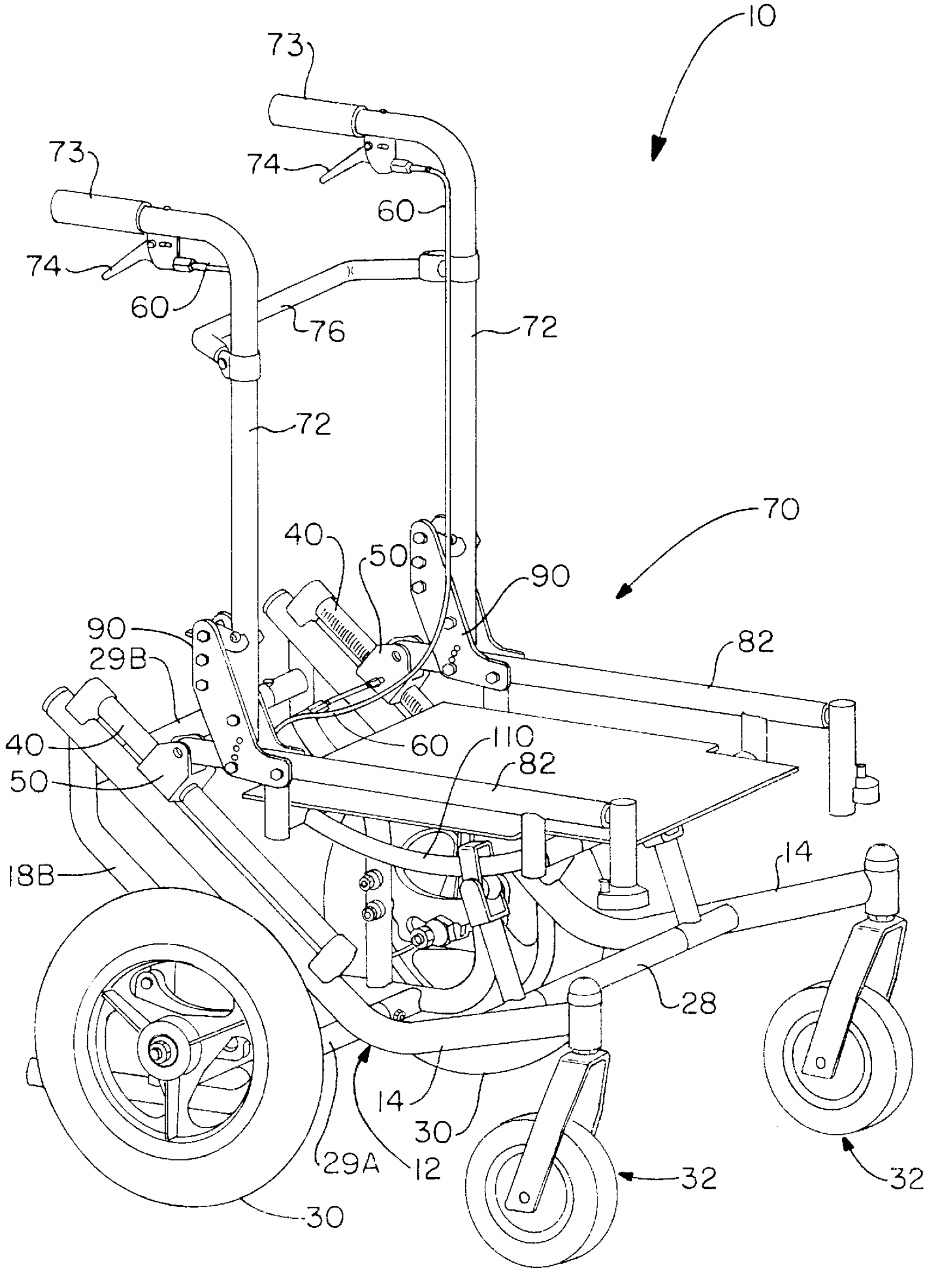
FIG. 1 is a perspective view of a wheelchair containing a tiltable seat according to the present invention.

A tiltable seat according to the present invention can be utilized on any conventional or typical wheelchair such as a powered wheelchair but desirably is utilized in association with a manual wheelchair. Wheelchair 10 contains mainframe 12 which has a front portion 14 and a rear portion 16 upwardly inclined at a predetermined angle with respect to the horizontal. The front end of frame front portion 14 contains a pivotal caster assembly 32 so that wheelchair 10 can be readily pivoted and turned in any desirable direction. Rear frame portion 16 contains a front leg 18A and a rear leg 18B depending therefrom which each containing a plurality of apertures 22 so that wheel 30 can be attached thereto at any desirable height through the utilization of a suitable or conventional wheel attachment structure. Such structure, which can be a bracket, can contain a plurality of slots or recesses so that the wheel axle can be located at any horizontal position. Connected to front frame portion 14 is support arm or clevis 24, which at the upper end thereof can have any convenient element such as roller 26 to allow a seat support member to slide or travel there over while being supported.

While various components will be shown by the drawings as being located on the right-hand side or left-hand side of the wheelchair, it is to be understood that such components exist on both sides of the chair and are very similar, and usually identical.

Gear rack 40 is connected to rear portion 16 of the frame through any suitable fastener 42 such as a cap screw. The gear rack can generally be of any shape or configuration such as a rectangle, a flange, a channel, or an annular tube 44 having along one side thereof recesses 46 with teeth 48 located there between. The recesses and teeth as shown in FIG. 6, generally extend along the entire length of the gear rack. Slidably engaging gear rack 40 is bracket 50 which generally can be of any size or shape and has an aperture 52 for receiving bracket pin 54 which pivotally receives a seat extension link discussed herein below in greater detail. Slidable bracket 50 can be operated manually as shown or by power (not shown). When operated manually, gear rack bracket 50 also receives pull cable 60 which is connected at the other end to a handgrip. The pull cable is received by spring loaded housing 56 of the gear rack bracket so that a projection, not shown, is always pressed or forced into a recess 46 of the gear rack thereby maintaining bracket 50 in a set or fixed position.

Seat 70 of the wheelchair contains back member 72 and bottom member 82 which constitutes a frame for the seat and exist on each lateral side of the seat as shown in FIG. 1. Back member 72 can be a metal tube or any other suitable article containing a handle 73 for gripping by an individual as well as pull cable release grip 74. Application of an upward pressure to the release grip or a squeezing pressure thereto by an individual causes pull cable 60 to be pulled upwardly along the back member and at its other end pulls the projection out of gear rack recess 46 so that the gear rack bracket can then be manually slid upwardly or downwardly and repositioned in another recess upon release of grip 74. When operated by power, not shown, bracket 50 can be moved in a number of different ways such as by a hydraulic piston connected to the frame, or by gear rack 40 being a worm gear meshing with teeth within the bracket. The back member also contains a transverse tilt bar 76, which in addition to handle 72, can be grasped by an individual to either push a manual wheelchair or to cause the seat to be manually tilted backward or forward. The height of the tilt bar can be adjusted by positioning the same in any of a plurality of apertures 77 which extend along the length of the back member. Located at a lower portion of back member 72 is seat back pin 78 which in part connects seat back 72 to connection plate 90. Typically, at the bottom end of the seat back, hinge pin 79 pivotally connects the seat back member to connection plate 90.

Seat bottom member 82 can be a metal tubular seat frame member generally located on the lateral sides of the seat and contain various fittings and the like upon which a seat, a seat cushion, and the like can be placed. At the back end of bottom members 82 are generally located two bolts, i.e., front bolt 84 and rear bolt 86, which through corresponding apertures of the bottom member secure connection plate 90 to the bottom member.

Connection plate 90 serves to fixedly secure seat back member 72 to seat bottom member 82 as an integral unit such as at an angle of 90 degrees with respect to each other. Moreover, connection plate 90 permits back member 72 to be fixedly secured to the bottom member at a number of recline positions other than 90 degrees, for example, up to a reclining angle of about 30 degrees at generally 10 degree increments. This is accomplished through the utilization of apertures 98A, 98B, and 98C. Thus, in lieu of utilizing seat bottom bolt 86 in the position indicated in FIG. 2, the bolt can be inserted in aperture 98C to recline the back an additional 10 degrees, i.e., a 100 degree angle with respect to seat bottom member 82. Similarly, angles of an additional 20 degrees or 30 degrees can be obtained by utilizing aperture 98B or 98A, respectively, to achieve an overall angle of 110 and 110 degrees respectively with regard to the seat bottom member.

Figure 2:
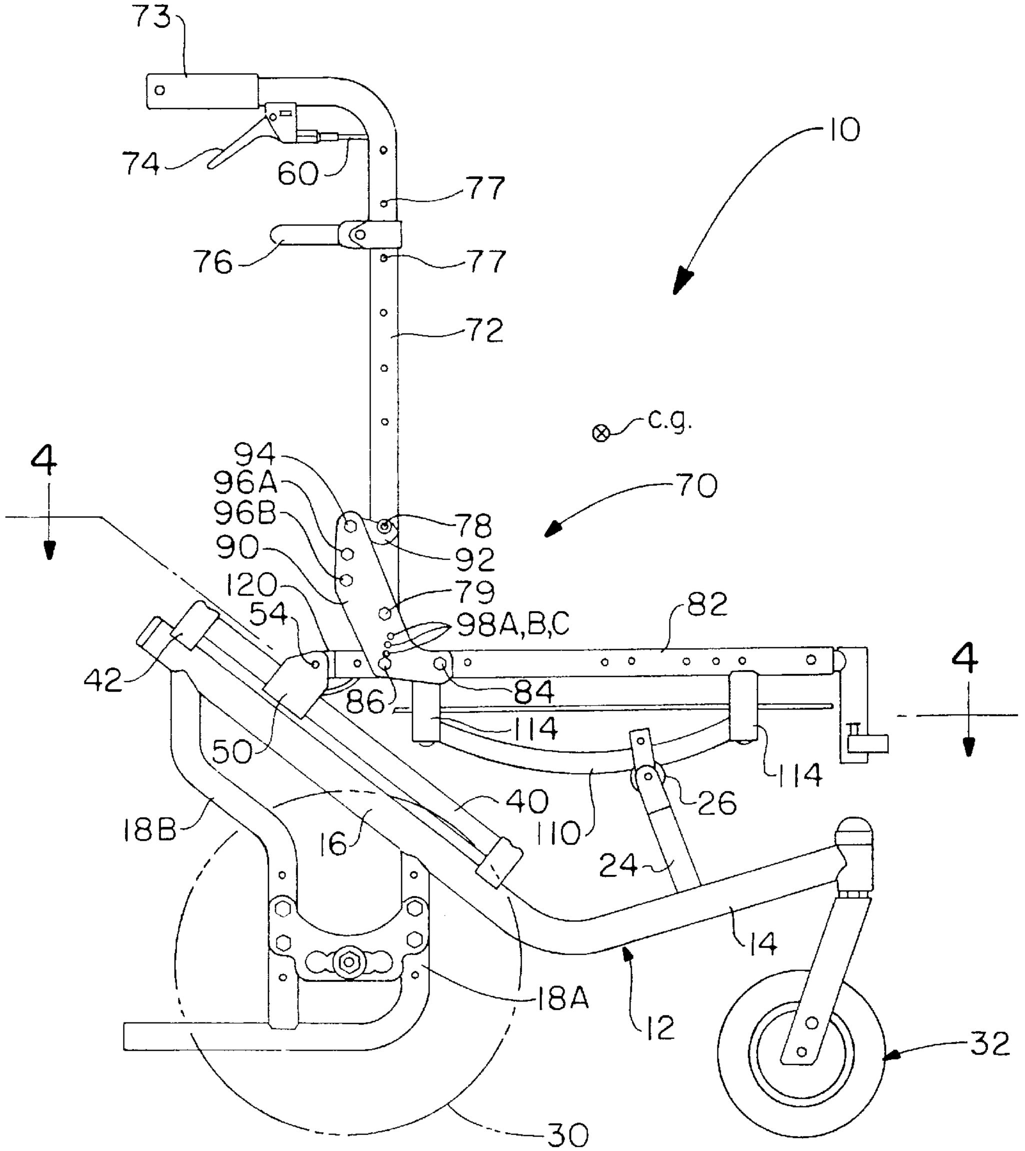
FIG. 2 is a side elevational view showing the seat in an upright position.

The utilization of spring loaded latch 92 permits seat back member 72 to be quickly disengaged from an integral connection with bottom member 82 and lowered to essentially a horizontal position when not in use. Spring latch 92 is pivotally attached to connection plate 90 through latch pivot pin 94. When wheelchair 10 is not in use, latch 92 can be pressed downwardly thereby freeing seat back pin 78 from mechanical engagement with a recess in latch 92 whereby the seat back can be lowered to reside over the seat bottom. Obviously, when the seat back is in use, it is utilized in an upward position as shown in FIG. 2. The lower portion of seat back member 72 which hinges about hinge pin 79 is prevented from moving backward by the engagement thereof with a stop block, not shown, which is secured to connection plate 90 through the utilization of stop block bolts 96A and 96B.

An important aspect of the present invention is the utilization of an archial support or curvilinear member 110 in conjunction with frame support or clevis arm 24. Archial support member 110, of course, is generally in the form of an arc of a circle. The radius of the arc, as noted above, terminates in an end point which is generally located within the vicinity of the center of gravity of a hypothetical or composite person. Such a person is defined as being representative of an average of a variety of different sized and shaped people. The location of the center of gravity of the hypothetical person is about 7.5 inches forward of back members 72 and 6.5 inches above bottom members 82. A different center of gravity location will exist if archial support member 110 is tailor made for a specific person or a class of persons (e.g., small or large) since the radius of the support member will be different. The radius end point of support member 110 is generally located within 4 or 3 inches, desirably within 2 inches, and preferably within 1 inch of the center of gravity of the hypothetical or composite person or other person. During tilting of seat 70, the radius end point of support member 110 will generally reside within a circle and more preferably along a horizontal line having, respectively, a diameter or length of less than about 4, 3, or 2 inches, or preferably less than about one inch from the center of gravity location. Archial support member 110 is connected to generally horizontal foot member 112 which in turn is connected to leg member 114 attached to the underside of bottom seat member 82. In order to assure lateral rigidity of the archial support members, each left and right side member is connected to each other through front cross member 116 and rear cross member 118 as shown in FIG. 4. Similarly, lateral stability of the main frame is accomplished by connecting left and right sides of main frame 12 to each other through frame front cross member 28 and frame rear cross member 29A and 29B. As shown in FIGS. 1 and 2, the seat contains a base or support member upon which a person's buttock resides, which member is recessed below the level of seat bottom frame members 82. Thus, the seat base or support member resides upon horizontal foot members 112 as well as front and back cross members 116 and 118, respectively, see FIGS. 1, 2, 4, and 5.

In lieu of the preferred archial support member 110, the same can be a curvilinear member such as a portion of a parabola, a hyperbolic, or a curve which is not part of a circle. Regardless of the exact shape of the curvilinear member, a key aspect of the present invention is that the curvilinear member has a shape such that when seat 70 is rotated on said member over support arm 24, the center of gravity of the hypothetical or composite person, etc., seated in the wheelchair is a point, located a specific distance forward of the back member and a specific distance above the bottom member, which point is generally maintained in a fixed position or relatively small locus as the seat is tilted backward or forward. Such locus is generally an area as noted above.

Figure 3:
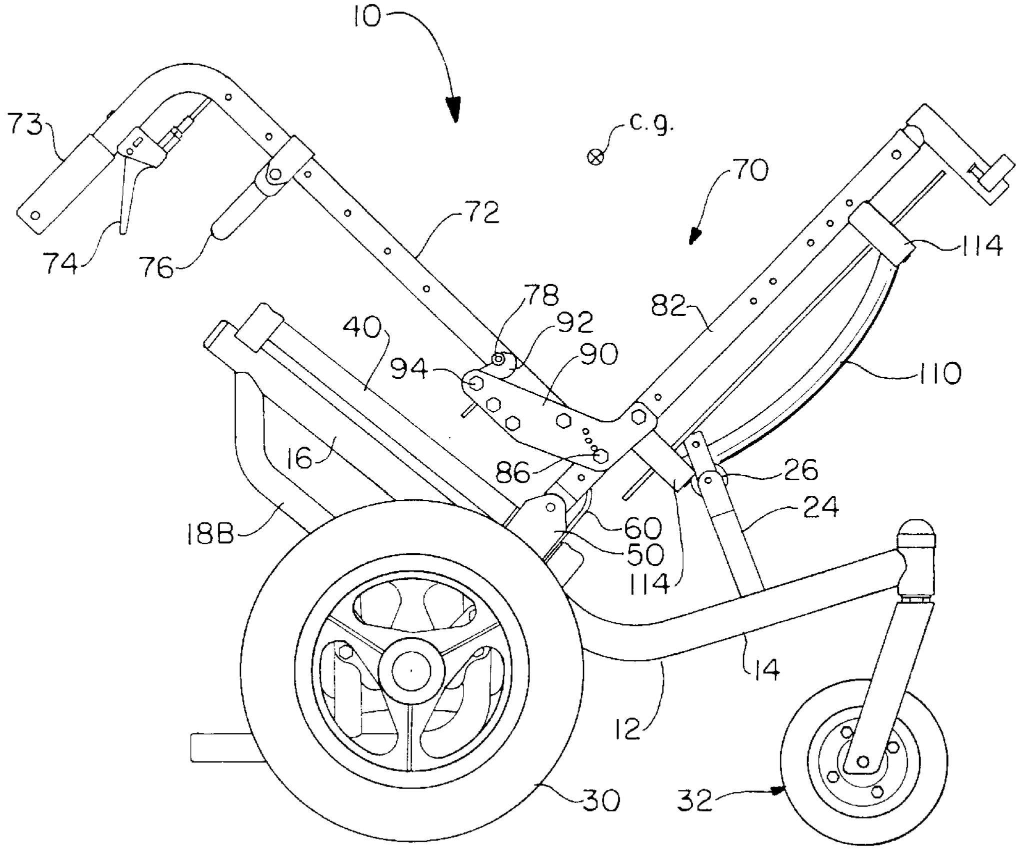
FIG. 3 is a side elevational view showing the seat in a tilted position.
Figure 5:
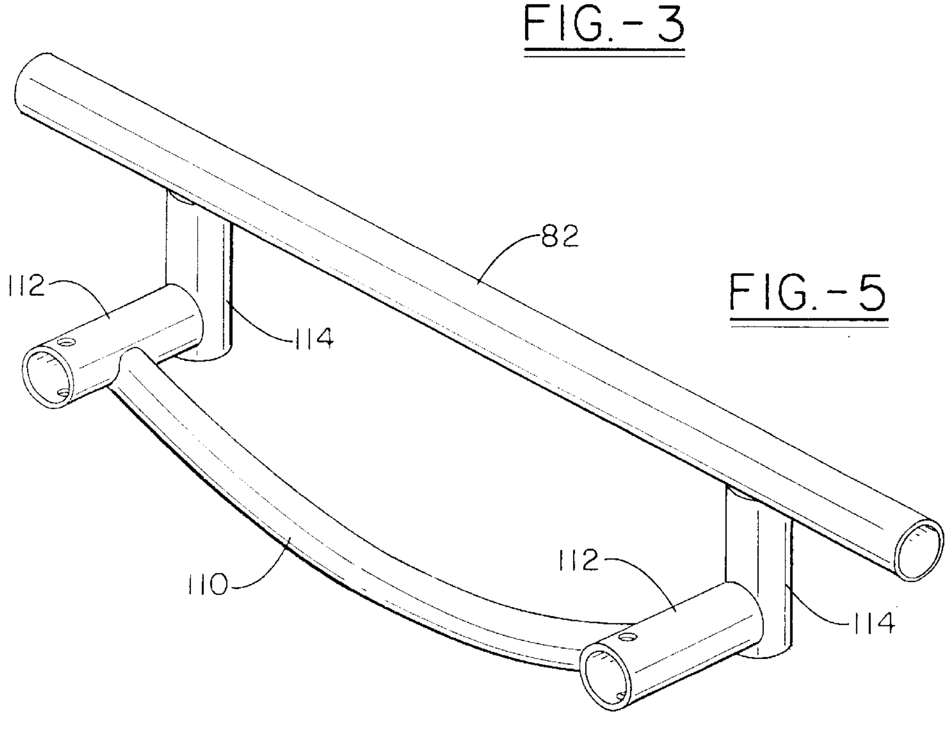
FIG. 5 is a perspective view showing the archial support member connected to a seat bottom member.

Extending generally from the vicinity of the junction of the back member and the bottom member such as from the rear of bottom seat member 82 is rigid link 120 which is pivotally attached to gear rack bracket 50. Gear rack 40 has an inclination which generally coincides with a straight line through or approximates an arc created by bracket pin 54 as the seat is moved from an upright position as shown in FIG. 2 to a rearward position as shown in FIG. 3. Thus, the angle of gear rack will vary depending upon the length of link 120 with the angle being more vertical for longer links (not preferred) and more longitudinal with regard to shorter link (preferred) lengths. Upon gripping pull cable release grip 74, seat 70 can be tilted as a unit rearwardly either through the use of handle 73 or transverse tilt bar 76. Generally, the seat can be tilted up to about 50 or 60 degrees. Rearward tilting of the seat causes bracket 50 to slide downwardly along gear rack 44 and at the same time cause seat bottom member 82 to move forwardly with archial support member 110 moving forward along roller 26. The combination of the inclination of rack 40 and the radius of curvature of archial support member 110 riding upon support arm 24 thus causes the center of gravity of a hypothetical or composite person, etc., seated within seat 70 to be substantially maintained as the seat bottom is moved forwardly and the back tilted rearwardly. In other words, the angle of inclination of the gear rack is such that the gear rack is parallel to the line that coincides with bracket pin 54 at both the maximum and minimum tilt of the seat when the seat is rotated about the center of gravity of a person independent of the frame 12.

Although the constant center of gravity tilt seat of the present invention has been described in association with a preferred embodiment having a manual tilt, it can utilize a power tilt. The tilt seat can also be utilized with any wheelchair base including power wheelchairs, i.e., powered by one or more batteries, as well as with different types of wheel drives, for example, front wheel drive, a mid wheel drive, or a rear wheel drive. All that is required is seat 70 and related structural components such as archial support member 110 and gear rack 40 be attached to the frame work of such vehicles in a manner as shown and described herein. Moreover, with regard to manual wheelchairs such as that shown in the drawings, different wheel sizes and locations can be utilized such as where the front wheels have a large diameter and the rear wheels have a smaller diameter.

While in accordance with the patent statutes the best mode and preferred embodiment have been set forth, the scope of the invention is not limited thereto, but rather by the scope of the attached claims.

What is claimed is:

1. A wheelchair, comprising;

a frame;

a tiltable seat operatively connected to said frame, said seat having a back member and bottom member;

an inclined gear rack fixedly connected to said frame, said gear rack operatively connected to said seat for controlling the tilting of said seat;

an archial support member connected to said seat bottom and operatively and movably engaging said frame, said archial support member having a radius the end point of which is adapted to coincide with the center of gravity of a person seatable in said seat, and said inclined gear rack in conjunction with said archial support member is adapted to substantially rotate said seat around the center of gravity of a person seatable in said seat.

2. A wheelchair according to claim 1, wherein said inclined gear rack has a bracket slideable thereon, said bracket operatively connected to the rear portion of said seat, said bracket causing said seat to tilt backward or forward as said bracket is respectively slid downward or upward along said gear rack so that said center of gravity is substantially maintained.

3. A wheelchair according to claim 2, wherein said frame has a support arm and said archial support member movably engages said support arm.

4. A wheelchair according to claim 3, wherein said seat is manually tiltable, wherein said slideable bracket has a cable connected thereto, and wherein said cable is capable of causing said slideable bracket to engage or disengage said gear rack and allow adjustment of different angles of tilt.

5. A wheelchair according to claim 4, wherein said gear rack contains a plurality of releasable engagement positions engagable by said slidable bracket to maintain said seat in a desired tilt position.

6. A wheelchair according to claim 4, including a connector plate, said connector plate having a latch to releasably engage said seat back to said seat bottom.

7. A wheelchair according to claim 4, wherein said wheelchair is a manual chair.

8. A wheelchair according to claim 4, wherein said gear rack has recesses on at least one side thereof.

9. A wheelchair according to claim 4, wherein said seat has a support cross member, and wherein said support cross member is recessed below said seat bottom member.

10. A wheelchair according to claim 3, wherein said seat has a support cross member, and wherein said support cross member is recessed below said seat bottom member.

11. A wheelchair according to claim 1, including a connector plate, said connector plate having a latch to releasably engage said seat back to said seat bottom.

12. A wheelchair according to claim 11, wherein said connector plate has a plurality of apertures so that said seat back can be connected to said seat bottom at a plurality of angular positions.

13. A wheelchair according to claim 11, wherein said seat has a support cross member, and wherein said support cross member is recessed below said seat bottom member.

14. A wheelchair according to claim 1, wherein said wheelchair is a manual chair.

15. A wheelchair according to claim 1, wherein said seat has a support member, and wherein said support member is recessed below said seat bottom member.

16. A wheelchair comprising:

a frame;

a tiltable seat operatively connected to said frame; said seat having a seat back member connected to a seat bottom member, said seat bottom having a curvilinear support member operatively and movably engaging said frame;

an inclined gear rack fixedly connected to said frame, said seat operatively and movably connected to said gear rack for controlling the tilting of said seat; said curvilinear support member generally having a center region spaced apart from and located above said wheelchair frame, and said inclined gear rack in association with said curvilinear support member being capable of tilting said seat about said center region.

17. A wheelchair according to claim 16, including a bracket slidable on said gear rack, said bracket causing said seat to tilt rearward or forward as said bracket is moved respectively in a first direction or in a second direction along said gear rack so that said seat substantially tilts about said center region.

18. A wheelchair according to claim 17, wherein said frame has a support arm, and said curvilinear support member movably engages said support arm.

19. A wheelchair according to claim 18, wherein said seat is manually tiltable, wherein said slidable bracket has a cable connected thereto, and wherein said cable is capable of causing said slidable bracket to engage or disengage said gear rack at different angles of tilt.

20. A wheelchair according to claim 19, including a seat support cross member which is located below said seat bottom member.

21. A wheelchair according to claim 19, wherein said gear rack has recesses on at least one side thereof.

22. A wheelchair according to claim 18, including a seat support cross member which is located below said seat bottom member.

23. A wheelchair according to claim 18, including a seat support cross member which is located below said seat bottom member.

24. A wheelchair according to claim 16, wherein said wheelchair is a manual wheelchair.

25. A wheelchair according to claim 24, including a seat support cross member which is located below said seat bottom member.

26. A wheelchair according to claim 16, including a seat support cross member which is located below said seat bottom member.

27. A wheelchair open to the front for seating a person, comprising:

a tiltable seat assembly having a back and a bottom which form an angle there between;

a frame supported by a plurality of wheels, a curved seat member which supports said seat assembly and which is supported by said frame so as to be variably positioned in a longitudinal direction relative to the front of said wheelchair; and an inclined member for controlling the tilting of said seat fixedly supported by said frame and further supporting a rear mount member which is pivotally connected to said seat so that said curved seat member and said inclined member operatively allow said seat assembly to tilt forward and rearward.

28. A wheelchair according to claim 27, wherein two of said curved seat support members exist which are located laterally opposite of each other, and wherein two of said inclined members exist which are located laterally opposite of each other.

29. A wheelchair according to claim 28, wherein said mount member can be locked in position relative to said inclined member.

30. A wheelchair according to claim 29, wherein said frame includes an arm having a grooved roller and said curved member is received in said grooved roller, and wherein said seat assembly is adapted to rotate around the center of gravity of a hypothetical person seatable in said seat.

31. A wheelchair according to claim 30, wherein said inclined member is a toothed rack.

32. A wheelchair according to claim 31, wherein said curved member defines an arc.

33. A wheelchair according to claim 32, wherein said seat has a support cross member, and wherein said support cross member is recessed below said seat bottom member.

34. A wheelchair according to claim 31, wherein said toothed rack has recesses on at least one side thereof.

35. A wheelchair according to claim 29, including a seat base recessed below said seat bottom member.

36. A wheelchair according to claim 27, wherein said seat has a support cross member, and wherein said support cross member is recessed below said seat bottom member.

37. A wheelchair according to claim 27, including a seat base recessed below said seat bottom member.

38. A wheelchair, comprising:

a wheelchair frame;

a seat having a bottom member and a back member;

an archial support member operatively connected to said seat bottom member and movably and operatively connected to said frame; and an inclined member fixedly connected to said frame, said inclined member operatively connected to said seat for controlling said seat to various degrees of tilt.

39. A wheelchair according to claim 38, wherein said seat bottom member includes two lateral sides, a leg extending downwardly from each said lateral side, at least one cross member operatively connected to said legs and a base residing upon said cross member.

40. A wheelchair according to claim 38, wherein said wheelchair is a manual wheelchair.

41. A wheelchair according to claim 38, wherein said seat is a manual tilt seat.

42. A wheelchair, comprising;

a wheelchair frame;

a seat having a bottom member and a vertical member; and an archial support member, said archial support member being located below and operatively connected to said seat bottom member, said archial support member moveably connected to said frame through a support arm of said frame; and a gear rack assembly fixedly connected to said frame for controlling tilting of said seat, said gear rack assembly operatively connected to said seat, so that said gear rack assembly and said archial seat support member can tilt said seat.

* * * * *